UNITED STATES PATENT OFFICE.

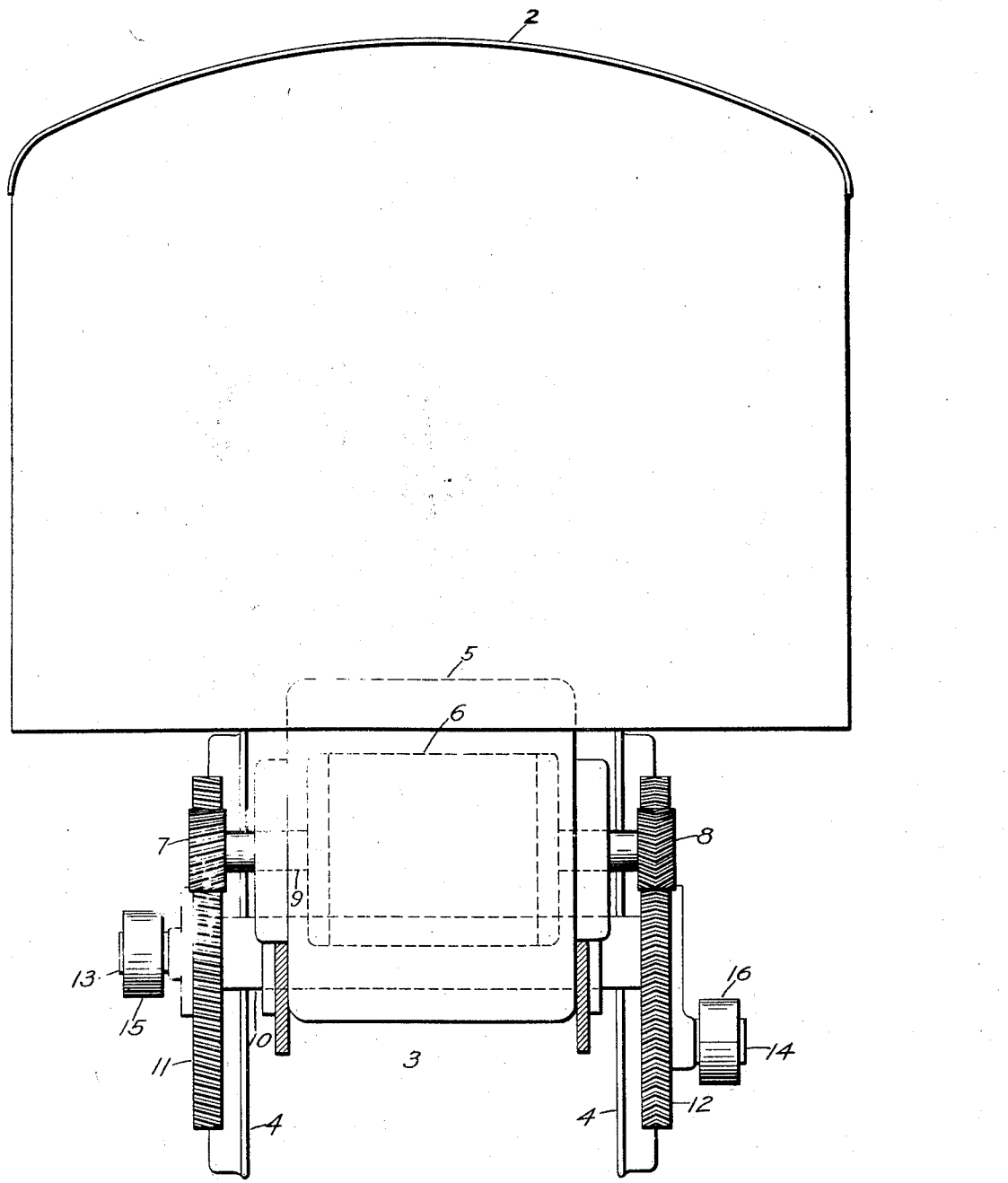

GEORGE M. EATON, OF PITTSBURGH, PENNSYLVANIA, ASSIGNOR TO WESTINGHOUSE ELECTRIC & MANUFACTURING COMPANY, A CORPORATION OF PENNSYLVANIA.

POWER-TRANSMISSION SYSTEM.

1,385,987.

Specification of Letters Patent.   Patented Aug. 2, 1921.

Application filed January 10, 1917.   Serial No. 141,620.

*To all whom it may concern:*

Be it known that I, GEORGE M. EATON, a citizen of the United States, and a resident of Pittsburgh, in the county of Allegheny and State of Pennsylvania, have invented a new and useful Improvement in Power-Transmission Systems, of which the following is a specification.

My invention relates to power-transmission systems and particularly to gear-wheel systems for transmitting power from driving to driven shafts.

One object of my invention is to provide a power-transmission system for connecting a driving to a driven shaft which shall embody two parallel gear-wheel systems respectively provided with gear wheels having dissimilar teeth.

Another object of my invention is to provide a transmission system for joining a motor shaft to a jack shaft which shall embody two parallel gear-wheel systems respectively provided with gear wheels having helical and herring-bone teeth.

More specifically, my invention embodies a power-transmission system comprising a motor provided with pinions mounted near the ends of the armature shaft thereof. A jack shaft is disposed adjacent to the motor and is provided with gear wheels which mesh with the armature pinions. One of said pinions and the gear wheel which meshes therewith is provided with helical teeth, and the other pinion and the gear wheel which meshes therewith are provided with herring-bone teeth, whereby smooth-running gear-wheel systems are obtained which may be constructed and assembled with facility.

Gear-wheel-transmission systems having spur gear wheels mounted near the ends of an armature shaft and meshing with spur gear wheels on a jack shaft have been installed on electric locomotives but such systems are subject to excessive vibration and the armature and the jack shaft may have longitudinal movement relative to each other. Helical gear wheels have been substituted in place of the spur gear wheels and, although excessive vibration of the gear wheels is prevented, still considerable end play of the shafts is liable to develop. It is impracticable to use two sets of herring-bone gear wheels in parallel-gear systems because of the extremely accurate angular and longitudinal location of the various gear wheels relatively to each other that is required.

In a power-transmission system constructed in accordance with my invention, a helical and a herring-bone gear wheel are disposed near the ends of an armature shaft and mesh with similar gear wheels mounted on a jack shaft. The parallel gear-wheel systems thus obtained do not vibrate excessively, are simple in construction and the shafts included therein are not subjected to excessive end play.

The single figure of the accompanying drawing is a sectional elevation of a locomotive embodying my invention.

Referring to the drawing, a locomotive 1 embodies a cab 2 and a running gear 3 having driving wheels 4. A motor 5, which is mounted on the driving gear 3, is provided with an armature 6 and two pinions 7 and 8 which are respectively mounted on the armature shaft 9 near the ends thereof. The pinion 7 is provided with helical gear teeth and the pinion 8 is provided with herring-bone gear teeth. Adjacent to the motor 5 is disposed a jack shaft 10 which is provided with gear wheels 11 and 12 which respectively mesh with the armature pinions 7 and 8. The gear wheels 11 and 12 are provided with quartered pins 13 and 14 which are connected to the driving wheels 4 by means of the connecting rods 15 and 16.

In a gear-wheel system provided with a helical and a herring-bone gear wheel, the herring-bone gear wheel performs the combined function of a gear wheel and of a thrust bearing. Moreover, the herring-bone gear wheel will transmit more than half the power of the propelling motor to the driving wheels by reason of the teeth in the helical gear constantly tending to move the shafts longitudinally and thus to transfer a portion of its load to the herring-bone gear wheel. In order to more evenly divide the load and minimize end play of the shafts, the herring-bone gear wheel should be designed with steep-angle helices and the helical gear wheel should be provided with teeth having small-angle helices.

Various modifications in the structure and arrangement and location of parts may be made without departing from the spirit and scope of my invention, and such modifications are intended to be covered by the appended claims.

I claim as my invention:

1. In a power-transmission mechanism, the combination with a driving and a driven shaft, of means comprising two parallel systems of gear wheels for joining said shafts, one gear-wheel system having gear teeth of a form to prevent relative longitudinal movement of the two shafts, and the other gear-wheel system having teeth of a form which will permit of relative longitudinal movement of the two shafts.

2. In a power-transmission system, the combination with a driving and a driven shaft, of means comprising two parallel systems of gear wheels respectively provided with helical and herring-bone gear teeth for joining said shafts together.

3. In a power-transmission system, the combination with a motor having a rotatable armature, of pinions mounted adjacent to the ends of the armature shaft, a driven shaft provided with gear wheels adapted to mesh with the pinions, one of said pinions and its associated gear wheel being provided with teeth of a form to prevent relative longitudinal movement of the shafts, and the other of said pinions and its associated gear wheel being provided with teeth of a form to permit relative longitudinal movement of the shafts.

4. In a transmission system, a shaft having two pinions mounted near the ends thereof, said pinions having helical and herring-bone teeth respectively formed on the peripheries thereof, gear wheels meshing with said pinions, and means for applying power to said shaft intermediate said pinions.

5. In a power-transmission system, a motor having pinions mounted near the ends of the armature shaft thereof, one of said pinions having helical teeth formed thereon and the other pinion having herring-bone teeth formed thereon, and gear wheels meshing with said pinions.

6. In a power-transmission system, the combination with a motor having a rotatable armature, of pinions mounted near the ends of the armature shaft, said pinions being respectively provided with helical and herring-bone teeth, and gear wheels meshing with said pinions.

7. In a power-transmission system, the combination with a driving and a driven shaft, of means comprising two parallel systems of gear wheels for joining said shafts, one of said parallel systems of gear wheels being provided with gear teeth which lock the shafts against longitudinal movement relative to each other and the second system of gear wheels being provided with gear teeth which permit longitudinal movement of said shafts relative to each other.

8. In a power-transmission system, the combination with a motor having an armature shaft, pinions disposed near the ends of said armature shaft, a jack shaft disposed adjacent to said armature shaft and having gear wheels meshing with the armature pinions, one of said pinions being provided with gear teeth which prevent longitudinal movement of the jack shaft relative to the armature shaft and the second pinion being provided with gear teeth which permit relative longitudinal movement of said shafts.

In testimony whereof I have hereunto subscribed my name this 30th day of Dec., 1916.

GEORGE M. EATON.